United States Patent
Fablet (10) Patent No.: US 7,870,495 B2
(45) Date of Patent: Jan. 11, 2011

(54) METHOD OF OFFERING A SERVICE PROVIDED BY A SERVER COMPUTER IN A COMMUNICATION NETWORK

(75) Inventor: Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 10/790,847

(22) Filed: Mar. 3, 2004

(65) Prior Publication Data

US 2004/0210836 A1 Oct. 21, 2004

(30) Foreign Application Priority Data

Mar. 3, 2003 (FR) .................................... 03 02557

(51) Int. Cl.
*G06F 3/00* (2006.01)
*G06F 17/00* (2006.01)

(52) U.S. Cl. ...................... 715/760; 715/234

(58) Field of Classification Search ................. 715/513, 715/234, 760

See application file for complete search history.

(56) References Cited

U.S. PATENT DOCUMENTS

| | | | |
|---|---|---|---|
| 5,774,673 A | 6/1998 | Beuk et al. | |
| 6,170,081 B1 * | 1/2001 | Fontana et al. | 717/104 |
| 6,496,843 B1 * | 12/2002 | Getchius et al. | 715/526 |
| 6,675,228 B1 * | 1/2004 | Bahrs et al. | 719/318 |
| 6,691,104 B1 * | 2/2004 | Kraft et al. | 707/3 |
| 6,816,871 B2 * | 11/2004 | Lee | 707/104.1 |
| 6,826,597 B1 * | 11/2004 | Lonnroth et al. | 709/207 |
| 7,039,701 B2 * | 5/2006 | Wesley | 709/224 |
| 7,073,120 B2 * | 7/2006 | Torii et al. | 715/513 |
| 7,136,908 B2 * | 11/2006 | Cline et al. | 709/220 |
| 7,159,007 B2 * | 1/2007 | Stawikowski | 709/202 |
| 7,167,920 B2 | 1/2007 | Traversat et al. | |
| 7,366,752 B2 * | 4/2008 | Stawikowski et al. | 709/202 |
| 7,386,860 B2 * | 6/2008 | Dani et al. | 719/315 |
| 7,437,710 B2 | 10/2008 | Bau, III et al. | |
| 7,493,397 B1 | 2/2009 | Guthrie et al. | |
| 7,496,637 B2 | 2/2009 | Han et al. | |
| 2002/0046239 A1 | 4/2002 | Stawikowski et al. | |

(Continued)

FOREIGN PATENT DOCUMENTS

EP 1221818 A1 7/2002

(Continued)

OTHER PUBLICATIONS

"SOAP Version 1.2 Part 1: Messaging Framework", W3C Working Draft Jun. 26, 2002, .w3.org/TR/2002WD-soap12-part1-20020626/> sited visited Mar. 26, 2004.

(Continued)

*Primary Examiner*—William L Bashore
*Assistant Examiner*—Ashraf Zahr
(74) *Attorney, Agent, or Firm*—Fitzpatrick, Cella, Harper & Scinto (57) ABSTRACT

A method of offering a service provided by a server computer in a communication network comprises a step (E11) of sending a service description document comprising a description of a functionality implemented during a preprocessing or post-processing of data in XML format of a message exchanged during the execution of the service on the communication network.

Use for specifying the various processings applied to data in XML format.

20 Claims, 5 Drawing Sheets

U.S. PATENT DOCUMENTS

| | | | |
|---|---|---|---|
| 2002/0103720 A1* | 8/2002 | Cline et al. | 705/27 |
| 2002/0120685 A1* | 8/2002 | Srivastava et al. | 709/203 |
| 2002/0129024 A1* | 9/2002 | Lee | 707/10 |
| 2002/0143819 A1* | 10/2002 | Han et al. | 707/513 |
| 2002/0147746 A1* | 10/2002 | Lee | 707/513 |
| 2003/0055748 A1* | 3/2003 | Bezrukov et al. | 705/27 |
| 2003/0055868 A1* | 3/2003 | Fletcher et al. | 709/201 |
| 2003/0055916 A1 | 3/2003 | Fablet et al. | 709/219 |
| 2003/0084078 A1* | 5/2003 | Torii et al. | 707/513 |
| 2003/0093574 A1 | 5/2003 | Fablet et al. | 709/310 |
| 2003/0115119 A1* | 6/2003 | Schleicher | 705/35 |
| 2003/0163513 A1* | 8/2003 | Schaeck et al. | 709/201 |
| 2003/0217044 A1* | 11/2003 | Zhang et al. | 707/3 |
| 2004/0117733 A1* | 6/2004 | Moreau et al. | 715/513 |
| 2004/0122747 A1* | 6/2004 | Jimenez et al. | 705/27 |
| 2004/0128369 A1* | 7/2004 | Moreau et al. | 709/220 |
| 2008/0040472 A1* | 2/2008 | Kato et al. | 709/224 |

FOREIGN PATENT DOCUMENTS

| | | |
|---|---|---|
| EP | 1229442 A2 | 8/2002 |
| WO | 02/01833 A1 | 1/2002 |

OTHER PUBLICATIONS

E. Christensen, "Web Services Description Language (WSDL) 1.1", W3C Note Mar. 15, 2001. www.w3.org/TR/2001/NOTE-wsdl-20010315>, sited visited Mar. 26, 2004.

M. Rose, "The Blocks Extensible Exchange Protocol Core", Invisible Worlds, Inc., Mar. 2001. .ietf.org/rfc/rfc3080.txt>, site visited Mar. 26, 2004.

A. Lewis, Concrete syntax proposal [Was: Re: Description of scenarios], Feb. 26, 2003, pp. 1-3, <lists.w3.org/Archives/Public/publics-ws-pnf-tf/2003Feb/0058.html>, site visited Nov. 7, 2003.

J. Moreau, "Re: A slice at a proposal for SOAP feature /properties in WSDL", Sep. 26, 2002, pp. 1-3, <lists.w3.org/Archives/Public/www-ws-desc/2002Sep/0080.html>, site visited Nov. 7, 2003.

G. Daniel, "Draft Proposal: WSDL Description of SOAP 1.2 Features", Sep. 4, 2002, pp. 1-3, <lists.w3.org/Archives/Public/www-ws-desc/2002Sep/att-0004/01-SOAP-feature-proposal.htm>, site visited Nov. 7, 2003.

F. Cohen, "Testing Net Web Services", The Institution Of Electrical Engineers, Stevenage, Great Britain. Feb. 2002.

D. Box, et al., "Simple Object Access Protocol (SOAP) 1.1", May 8, 2000, p. 22, line 23 to p. 25, line 16. <URL:http://www.w3.org> (visited Feb. 22, 2001).

E. Christensen, et al., "Web Services Description Language (WSDL) 1.0", Sep. 25, 2000. <URL:http://www-4.ibm.com/software/developer/library> (visited Sep. 25, 2000).

W3C, Web Services Description Language (WSDL) 1.1, Mar. 15, 2001, p. 12, section 2.1.3 <http://www.w3c.org/TR/wsdl>.

* cited by examiner

METHOD OF OFFERING A SERVICE PROVIDED BY A SERVER COMPUTER IN A COMMUNICATION NETWORK

The present invention concerns a method of offering a service provided by a server computer in a communication network.

It also concerns a method of testing access to a service by a client computer and a method of validating a message received by an intermediate computer in the communication network.

Within a computer communication network of the Internet type, server computers are more and more often offering services to other computers, known as client computers, in this communication network.

In practice, the client computer sends data to the server computer, which processes them and returns a result.

Such services are known as Web services.

A Web service is a service identified by a URI and accessible via XML and an Internet protocol.

Because of the increase in these services available on a communication network, the data exchange protocols between computers are frequently standardized.

Thus the SOAP protocol is a protocol for exchanging information structured on top of the Internet.

According to this SOAP protocol, the information exchanged is structured by means of XML (the acronym of the English term "eXtended Markup Language") markers.

The SOAP standard defines the general structure of the messages exchanged as well as the processing steps to be performed by a computer sending or receiving SOAP messages.

Thus, when a Web service is executed, one or more messages comprising data to the XML format are exchanged on the communication network.

The SOAP protocol is an extendable protocol, that is to say the standard defines only the core of the protocol, additional functionalities being able to be added to this protocol.

These additional functionalities are referred to as "features". The SOAP standard version 1.2 proposes a convention for describing these additional functionalities, this convention being based on the use of properties associated with each functionality.

A description of the SOAP 1.2 standard is described at SOAP Version 1.2 Part1: Messaging Framework, W3C Working Draft, 26 Jun. 2002.

In particular, each property is described by its name and its data type.

The description of each functionality comprises, in addition to the properties, a model describing how these properties are used when this functionality is implemented.

Moreover, a language describing a WSDL (the acronym of the English term "Web Service Description Language") computer service is known which is particularly well adapted to describe a service on a communication network.

This WSDL language is itself an application of the XML mark-up language.

A description of the WSDL 1.2 language will be found at Web Services Description Language (WSDL) 1.1, W3C Note, 15 Mar. 2001.

An electronic document describing a service in WSDL language generally comprises two parts. A first part, referred to as the "abstract part", is adapted to describe the messages exchanged between a computer in the communication network when a service is supplied.

In particular, this first part defines the type of data exchanged, the type of message used when the service is executed, and the operations implemented, defined by the messages which are exchanged when the service is executed.

The document describing a WSDL service also comprises a second part adapted to define information relating to the transmission of the messages on the communication network.

This second part, called the "concrete part", specifies in particular via a coupling (binding) the communication protocol which is actually used for the transfer of the messages, and the format in which the data will be represented for the communication thereof within the communication network.

Thus the services offered on the Internet mainly exchange XML data whose type is known in advance, for example through a description of a service such as a WSDL document.

Moreover, many tools make it possible to manipulate XML data, that is to say to produce XML data, to transform them or to use these XML data.

Thus there is known a language for converting XML documents, of the type with an XSL (the acronym of the English term "extensible Stylesheet Language") script defined by the X3C standard.

In practice, an XSL processing unit takes as an input a document written in XML mark-up language and an XSL document. The latter comprises a set of conversion rules which will permit the generation of a new document, which may be either to the XML format or in a text format. The XSL standard is itself based on the XML standard.

Likewise a document object model (DOM) is known which consists of an interface or API (neutral from the point of view of the programming language), which enables programs/scripts to access and modify an XML document. The DOM interface is in particular supported by various script languages such as JavaScript. In addition to JavaScript, other languages, such as Perl or Python allow the manipulation of XML documents via the DOM interface.

The various processing tools making it possible to use these XML data processing scripts are more and more often integrated in the terminals of a communication network, at a client or a server.

However, the capabilities for manipulation of XML data are different from one terminal to another.

Moreover, the processings of XML data can be carried out at different times, and in particular by a client computer before it sends the XML data, by a server computer before it uses the XML data, by a server computer before it sends the XML data or by a client computer before it uses the XML data.

Thus main types of processing are distinguished, the pre-processing of data to XML format, which will take place on reception of the XML data, before their use, and the post-processing of data which takes place after the use of XML data, before they are sent.

Consequently it is advantageous on such a communication network for a client computer to know which type of processing a server computer offers.

Moreover, some servers require the integration of certain processing tools at the client computers.

At the present time it is not possible to describe on the communication network the type of processing (preprocessing or post-processing) offered by one or other of the terminals in the communication network.

Some networks are known in which processings are defined and supported by a server computer in a predefined manner, without other types of processing being able to be added extensively.

Specific databases are also known which support an XSL processing. In this case, a client computer can send a request for a document in which an XSL script is included.

The XSL script is used for converting the documents identified in the database before they are transferred to the client computer. Such a system is however limited to an interaction between a client computer and a specific database for which a client computer knows that the XSL processing tool will be supported.

The purpose of the present invention is thus to resolve the aforementioned drawbacks and to propose a system in which it is possible to define on the communication network the processings to be carried out which will produce or use data in XML format of a message.

To this end, the present invention relates to a method of offering a service provided by a server computer in a communication network.

This method comprises a step of sending a document describing a service comprising a description of a functionality implemented during a preprocessing or a post-processing of data in XML format of a message exchanged during the execution of the service on the communication network.

The present invention thus makes it possible to directly define, through a document describing a service of the WSDL type, the processings which can be applied to the data in XML format exchanged when the service is implemented.

By virtue of the definition of a functionality, of the functionality ("feature") type as defined in the SOAP standard, it is possible to describe and use this functionality in the service description document.

The use of such a functionality makes it possible to add, without limitation, various processings which may be implemented in various terminals in the communication network.

By virtue of the integration of this functionality in a document describing a service of the WSDL type, it is possible to define and inform the various documents in the communication network of the existence of these processings in the network.

According to a preferred characteristic of the invention, this functionality defines the processings adapted to produce or use the data in XML format defined in a first abstract part of a service description document. The processing functionality can thus be offered for all the protocols available.

It is thus possible to specify processings applicable to XML data whose type is known and defined through a description such as a WSDL document.

Preferably, this functionality describing a processing adapted to manipulate (use or produce) abstract data in XML format, its description is preferably associated with these abstract data within the service description document.

According to one advantageous characteristic of the invention, the preprocessing or post-processing of the data is implemented via a script language.

According to another embodiment of the invention, which advantageously allows the use of the functionality for any type of protocol, the functionality is described as a data item in XML format in a first abstract part of the service description document.

In this embodiment, this data item in XML format defining the functionality is preferably encoded in a second concrete part of the service description document.

Thus the functionality is offered at the abstract level of the WSDL document. In this case, the added processing results in an XML data item (optional or obligatory) added to the message. This XML data item is then encoded at the concrete part of the WSDL document just like any other part of the abstract message.

Thus the functionality is offered to all the protocols.

According to another preferred characteristic of the invention, the description of the functionality comprises a list of properties supported by the functionality, the properties defining at least respectively:
the node of the communication network adapted to execute the processing; and
the type of processing.

This functionality can thus comprise various items of information defined in the form of properties.

It is in particular possible to define the type of processing and the point in the communication network adapted to implement this processing.

This functionality can comprise a property adapted to specify whether the processing is carried out on the sending or reception of the message.

This functionality preferably also comprises a property adapted to specify the message or a set of messages to which the processing is applied.

Likewise, this functionality preferably comprises a property adapted to define the data produced or used by the processing, and possibly the type of these data.

It is thus possible, by virtue of the type of these data defined in the WSDL description document, to validate before and after processing the data generated by determining whether the type of these data corresponds effectively to the type predefined through the description of the functionality.

According to another preferred characteristic of the invention, this functionality also comprises a property adapted to specify whether the processing is carried out on the sending or reception of a message, in order to determine whether it is a case of a post-processing or a preprocessing of the data in XML format of the message.

According to one advantageous characteristic, the description of the functionality also comprises a property adapted to specify whether the processing to be carried out is obligatory or optional.

In practice, for at least one property supported by the functionality, the description of this functionality comprises a list of values which can be attributed to this property.

It is thus possible to use the mechanism defined by the SOAP standard to describe the various properties of this functionality.

According to another aspect of the invention, it concerns a method of testing access to a service by a client computer in a communication network, from a service description document.

This access test method comprises the following steps:
extracting a description of a functionality implemented during a preprocessing or the post-processing of data in XML format of a message exchanged during the execution of the service on the communication network;
reading the value associated with a property adapted to specify the node in the communication network adapted to execute the processing;
reading the value of a property adapted to specify whether the processing is obligatory or optional; and
verifying whether the processing is supported by the client computer in the communication network when the processing is obligatory and must be executed by the client computer in the communication network.

It is thus possible for the client computer to test whether it is adapted to interact with a service offered by a server computer.

According to a third aspect of the invention, it concerns a method of validating a message received by an intermediate computer in the communication network, from a service description document comprising a description of a functionality implemented during a preprocessing or the post-processing of data in XML format of the message exchanged during the execution of this service on the communication network.

This validation method comprises the following steps:
extracting a processing from the message received;
acquiring at least one imperative value associated with a property of the processing; and
verifying whether the imperative value is included in a list of values which can be attributed to a property supported by the functionality described in the service description document.

It is thus possible, from a message and the values of the properties associated with each processing included in the message, to verify whether it corresponds to the description of the processing as described in the functionality of the service description document.

Preferably, at the time of this validation of the message by an intermediate computer, the method comprises a step of reading the value associated with a property adapted to specify whether the processing is executed before or after the sending of the message and a step of executing this processing when the value is adapted to specify that the processing must be executed before the message is sent.

The present invention also concerns a device for offering a service provided by a server computer in a communication network.

This device for offering a service comprises means of sending a service description document comprising a description of a functionality implemented during a preprocessing or a post-processing of data in XML format of a message exchanged during the execution of this service on the communication network.

It also concerns a device for testing access to a service by a client computer in a communication network, from a service description document, comprising:
means of extracting a description of a functionality implemented during a preprocessing or the post-processing of data in XML format of a message exchanged during the execution of the service on the communication network;
means of reading the value associated with a property adapted to specify the terminal in the communication network adapted to execute the processing;
means of reading the value of a property adapted to specify whether the processing is obligatory or optional; and
means of verifying whether the processing is supported by the client computer in the communication network when the processing is obligatory and must be executed by the client computer in the communication network.

The present invention also concerns a device for validating a message received by an intermediate computer in the communication network, from a service description document comprising a description of a functionality implemented during a preprocessing or the post-processing of data in XML format of the message exchanged during the execution of a service on the communication network.

This validation device comprises:
means of extracting a processing from the message received;
means of acquiring at least one imperative value associated with a property of the processing; and
verification means adapted to verify whether the imperative value is included in a list of values which can be attributed to a property supported by the functionality described in the service description document.

These devices for offering a service, testing access and validating a message received have characteristics and advantages similar to those of the methods which they implement.

In addition, the present invention concerns a computer comprising a device offering a service or a device testing access or a device validating a message in accordance with the invention.

It relates particularly to a server computer in a communication network comprising means adapted to implement the method of offering a service in accordance with the invention.

Correspondingly, it relates to a client computer in a communication network comprising means adapted to implement the access test method according to the invention.

The present invention also relates to a computer in a communication network comprising means adapted to implement the message validation method according to the invention.

Finally, it concerns a computer program which can be read by a microprocessor comprising portions of software code adapted to implement the method of offering a service and/or the method of testing access and/or the method of validating a message in accordance with the invention, when this computer program is loaded in and executed by the microprocessor.

The computers, the server computer, the client computer and the computer program have characteristics and advantages similar to the methods which they implement.

Other particularities and advantages of the invention will also emerge from the following description.

In the accompanying drawings, given by way of non-limiting examples.

Figure 1:
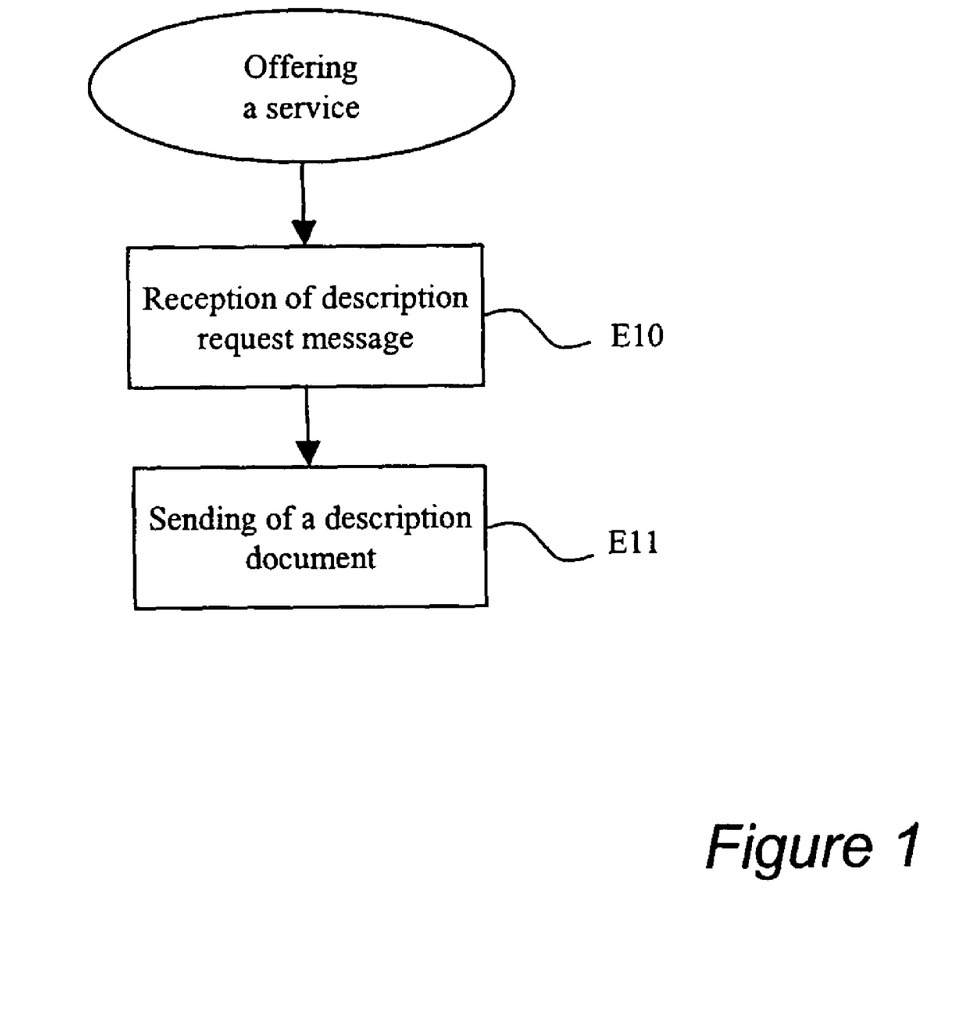
FIG. 1 is an algorithm illustrating a method of offering a service in accordance with the invention.

A method of offering a service provided by a server computer in a communication network will be described first of all with reference to FIG. 1.

In a computer network such as the Internet, servers supply data in the form of documents to client computers.

Very frequently, these server computers also provide services, referred to as Web services, enabling a client computer to send data to the server, which processes them and returns a result.

In practice, when a client computer in a communication network wishes to use the services provided by a server computer, it sends a message in order to request a description of the services provided by this server computer.

On reception E10 of such a description request, the method of offering services comprises a step E10 of sending a service description document.

In the remainder of the description, non-limitingly, it will be considered that this service description document uses the WSDL language (the acronym for the English term "Web Service Description Language"), which is a language for describing Web services.

This WSDL language is an improved XML language for describing a Web service by means of XML markers.

A WSDL document contains mainly two parts. A first part, referred to as the abstract part, describes in an abstract manner the messages which are exchanged between computers in the communication network when the service is implemented. A second part is adapted to comprise the concrete information defining the transmission of the messages on the communication network.

The first part is itself divided into three sub-parts.

The first sub-part of this first part contains declarations of types, for describing the abstract structure of the messages. These types are then referenced in the second sub-part of the first part of the WSDL document.

The declaration of these types is generally carried out by means of markers <types> . . . </types>.

This declaration of types is well known in documents written in XML language and it is not necessary, for an understanding of the invention, to describe the types used any further.

The second sub-part of the first part of the document contains declarations of elementary messages.

It thus defines the messages which will be exchanged between the computers when the service is implemented, without precisely describing the content or concatenation thereof.

It consists of defining in an abstract manner and giving the type of a data item transmitted (input or output).

By way of example, and solely to facilitate understanding of the present invention, the following messages can be defined, without any link between them:

a) a first message transmits the name of an action:

```
<message name="GetStockQuoteInput">
    <part name="Name" type="string"/>
</message>
``` b) a second message transmits the price associated with an action:

```
<message name="GetStockQuoteOutput">
    <part name="Price" type="float"/>
</message>
```

A third sub-part of the first part of the WSDL document groups together the elementary messages thus defined in the first two sub-parts in logic operations.

An operation can be considered to be an elementary service, the latter itself being located by one or more messages.

It is thus defined by its inputs and outputs, that is to say by the messages which it exchanges.

For example, an operation returning the value of an action when the name of this action is received can be defined as follows:

```
<operation name="GetStockQuote">
    <input message="tns:GetStockQuoteInput"/>
    <output message="tns:GetStockQuoteOutput"/>
</operation>
```

Obviously more elaborate forms of operation, consisting of a complex set of exchanges of messages, could be described in this language.

This first part of the WSDL document thus makes it possible to define the type, the content and the sequencing of the messages exchanged between computers in the network when a service offered by a server computer is implemented.

The WSDL document also comprises, as explained previously, a second concrete part which specifies what protocol is actually used for transmitting the messages and what encoding or representation format is used for representing these data in a form adapted to the communication network.

This second part thus corresponds to a coupling (binding) consisting of specifying a concrete protocol and a data format for an operation defined in the first part of the WSDL document.

In accordance with the invention, the service description document comprises the description of a functionality implemented during a preprocessing or post-processing of data in XML format of a message exchanged during the execution of the service on the communication network.

This functionality thus makes it possible to define processings to be carried out on a message.

It is a case in particular of processings which use or produce data in XML format which are defined in the abstract part of the WSDL service description document.

It should be noted however that a processing can combine several processing steps.

This functionality description consists of defining a functionality by a list of properties supported by this functionality.

It is then a case of giving a description of the functionality, for example in a mark-up language of the XML type, by describing the properties associated with this functionality. These elements or functionalities thus defined, they can be used in order to be included in a service description of the WSDL document type.

In this way a service description document is obtained written in an improved WSDL language, describing, directly in this document, the processings to be carried out on a message.

The properties of this functionality make it possible to determine in particular on which message or on which set of messages the processing is applied; the time at which the processing is carried out, and in particular the sending or reception of the message by computer; which data in the message the processing uses or generates and the type of data thus generated.

When the processing is implemented via a script language, it is necessary also to define the possible scripts for executing this processing.

In addition, it is advantageous for a property to make it possible to specify whether the processing to be carried out is obligatory or optional or negotiable.

A first example of a description in XML language of such a processing functionality will be given below.

The XML description of a functionality is thus encapsulated in an XML element. It is here considered non-limitingly that the functionality is of the type consisting of an element ("feature") as defined by the SOAP standard.

This element comprises an obligatory attribute "name" making it possible to give a name to the processing and subsequently to reference the description of this functionality.

In addition, the list of properties supported by this functionality is inserted in the element. Each property is defined by an element which is called a "property". This element has an obligatory attribute "name". For each property, the description of this functionality comprises a list of values which can be attributed to this property.

Thus, by way of example, the functionality "process feature" can be described in the following fashion, in the form of an XML diagram:

```
<feature name="ProcessFeature">
    <property name="process" type="ProcessType"/>

<property name="value" type="ValueType"/>

<property name="data" type="DataType"/>

<property name="rule" type="RuleType"/>

</feature>
<xs:complexType name="ProcessType">
    <xs:element name="process">
        <xs:complexType>
            <xs:attribute name="name" type="xs:string"/>
            <xs:attribute name="side">
                <xs:simpleType>
                    <xs:restriction base="xs:NSTOKEN">
                        <xs:enumeration value="sender"/>
                        <xs:enumeration value="receiver"/>
                    </xs:restriction>
                </xs:simpleType>
            </xs:attribute>
            <xs:attribute name="order" type="xs:integer"
use="optional"/>
            <xs:attribute name="msg" type="xs:NCNAME"/>
        </xs:complexType>
    </xs:element>
</xs:complexType>

<xs:complexType name="ValueType">

<xs:element name="type" maxOccurs="unbounded">
        <xs:complexType>
            <xs:element name="value" minOccurs="0">
                <xs:complexType>
                    <xs:choice>
                        <xs:any processContents="lax" minOccurs="0"
maxOccurs="unbounded"/>
                        <xs:element name="value">
                            <xs:complexType>
                                <xs any processContents="lax"
                                    minOccurs="0" maxOccurs="unbounded"/>
                                <xs:complexType>
                            </xs:element>
                        </xs:choice>
                    </xs:complexType>
                </xs:element>
                <xs:anyAttribute processContents="lax" minOccurs="0"
maxOccurs="unbounded"/>
            </xs:complexType>
        </xs:element>
</xs:complexType>

<xs:complexType name="DataType">

<xs:element name="data">
        <xs:complexType>
            <xs:element name="input" minOccurs="0">
                <xs:complexType>
                    <xs:attribute name="ref" use="optional"/>
                    <xs:attribute name="type" use="optional"/>
                    <xs:anyAttribute processContents="lax"
                        minOccurs="0" maxOccurs="unbounded"/>
                    <xs:any processContents="lax"
                        minOccurs="0" maxOccurs="unbounded"/>
                </xs:complexType>
            </xs:element>
            <xs:element name="output" minOccurs="0">
                <xs:complexType>
                    <xs:attribute name="ref" type="xs:string"
use="optional"/>
                    <xs:attribute name="type" type="xs:string"
use="optional"/>
                    <xs:anyAttribute processContents="lax"
                        minOccurs="0" maxOccurs="unbounded"/>
                    <xs:any processContents="lax"
                        minOccurs="0" maxOccurs="unbounded"/>
                </xs:complexType>
            </xs:element>
        </xs:complexType>
    </xs:element>
</xs:complexType>

<xs:complexType name="RuleType">

<xs:element name="rule">
        <xs:simpleContent>
            <xs:attribute name="value" type="xs:boolean"
use="required">
                <xs:simpleContent>
                    <xs:restriction base="xs:string">
                        <xs:enumeration value="mandatory"/>
                        <xs:enumeration value="optional"/>
                    </xs:restriction>
                </xs:simpleContent>
            </xs:attribute>
        </xs:extension>
        </xs:simpleContent>
    </xs:element>
</xs:complexType>
```

Thus, in this example, the functionality "process feature" has a property, called "process", which makes it possible to define the target message and the processing entity, that is to say the node in the communication network adapted to execute the processing.

It also comprises a property called "value" and which makes it possible to define the type and value of the processing.

The functionality also comprises a property called "data", which defines the data input to and output from the processing, and in particular the type of data generated.

In addition, a property "rule" makes it possible to define whether the processing to be carried out is obligatory or optional.

Each property is thus described by means of a scheme language, such as XML-scheme, so that the description of each property is inserted by reference in the description of the functionality.

Thus, in the above example, the property "process" defines the message to which the processing applies in the form of an attribute having the name "msg". This attribute can define a particular message, or a set of messages, for example all the messages sent by a server computer.

This property "process" also comprises an attribute "side" for defining whether the processing is carried out on sending, by a sender, or on reception, by a receiver of the message.

Thus the values which can be taken by this attribute "side" are typically "sender" or "receiver".

A second property "value" makes it possible to define the values which can be taken by a script during processing. This property makes it possible to define the type of script used via an element "type" comprising an attribute "name". Within this element "type", it is possible to add constraints, such as for example the possibility of using certain parts of the language.

It also possible to offer the choice between several scripts. Finally, one and the same processing may support several types of script; it then suffices to add to the description as many elements "type" as there are types of script.

A property "data" also makes it possible to define the data used via an element "input" and the data produced via an element "output". These elements can contain an attribute "ref" which determines the part of the message. In the above example, the type of data is specified at least at the input or output of the processing.

It is thus possible to determine whether the data at the input are valid and, after execution of the script, whether the output data are valid.

This type of data can be specified indirectly via an abstract definition of the message in a WSDL document or directly by an attribute "type".

Finally, a property "rule" makes it possible to define whether the processing to be carried out is obligatory or optional.

In the absence of this property, the processing is obligatory.

Although one example of a functionality using the SOAP protocol, permitting the processing of abstract data via a SOAP feature, has been described above, any type of functionality, then applied to any other protocol, could be described in the same way at the abstract level of a document describing a WSDL service.

Thus it is possible to implement a processing functionality at the abstract level of the document describing a WSDL service, adding an XML data item to the message, representing a processing to be carried out on data.

This XML data item is then encoded (or serialized) at the level of the second concrete part of the document describing a WSDL service just like any other abstract message part.

Thus this functionality is offered to any type of protocol, and for example to the SOAP protocol, to the HTTP protocol or to the BEEP protocol, a description of which can be consulted at the following address: http://www.ieff.org/rfc/rfc3080.txt A default decoding depending on the protocol is then defined in the description of this functionality, such as for example:

for HTTP, a mime message part;
for SOAP, a particular header; and
for BEEP, a particular XML element.

Thus it is not necessary to specify concrete data in the document. However, if it is wished to specify concrete information in the WSDL document, a reference to the property concerned is used.

An example of such a reference is given below:

```
<portType name="fooPT">
    <operation name="foo1OP">
        <input message="foo1MsgIn" name="in"/>
        <output message="foo1MsgOut" name="out"/>
        <feature ref="ProcessFeature" mustUse="false">
            <property name=" process">
                <process name="XSLT_IN" side="receiver" msg="name:foo1MsgIn"/>
            </property>
            <property name="http://xslt-feature/value">
                <value>
                    <type name="XSLT"/>
                </value>
            </property>
            <property name="data">
                <data>
                    <output ref="part:*"/>
                </data>
            </property>
        </feature>
    </portType>
    <binding name="fooSoap" type="fooPt">
        <soap:binding transport="http://example.com/soap/http"/>
        <operation name="foo1OP">
            <input>
```

-continued

```
                <soap:body part="xml-data1" .../>
                <soap:header part="xml-data2" .../>
                <soap:header part="http://xslt-feature/value" .../>
            </input>
            <output/>
        </operation>
    </binding>
    <binding name="fooHttp" type="fooPt">
        <http:binding transport="http://example.com/http"/>
        <operation name="foo1OP">
            <input>
                <mime:multipartRelated>
                    <mime:part>
                        <mime:content
                            part="xml-data1" use="literal"/>
                    </mime:part>
                    <mime:part>
                        <mime:content part="xml-data2" use="literal"/>
                    </mime:part>
                    <mime:part>
                        <mime:content
                            part="http://xslt-feature/value"
                            type="text/my-op-script" />
                    </mime:part>
                </mime:multipartRelated>
            </input>
            <output/>
        </operation>
    </binding>
```

Thus it is possible to encode the value of an abstract property by means of a reference mechanism identical to the one used for encoding abstract data in the messages.

In addition, a default encoding can be defined in a format which can be understood by a machine for various protocols.

The first example embodiment is now returned to, in which the functionality is of the type consisting of an element "feature" as defined by the SOAP standard.

Once the properties of the functionality have been defined, it is possible to describe a service implementing this functionality through a document describing a WSDL service.

The description of this functionality is preferably included, via an element "feature", placed in the abstract part of the service description document, provided that this functionality is adapted to produce or use data in XML format defined in this same abstract part.

In the element "feature", the values taken by the various properties are specified, amongst the list of values attributable to each property. In other words, the definition of the functionality gives a set of values which can be taken by each property, and the document describing a WSDL service is adapted to define a subset of these property values, that is to say to add constraints on the values which these properties can take.

An example is given below of a use of the functionality described above in a form which can be incorporated in a document describing a service of the WSDL type.

```
<portType name="fooPT">
    <operation name="foo1OP">
        <input message="foo1MsgIn" name="in"/>
        <output message="foo1MsgOut" name="out"/>
        <feature ref="ProcessFeature" mustUse="false">
            <property name="process">

<process name="XSL_IN" side="reciever"
```

```
<msg="name:foo1MsgIn"/>

</property>
        <property name="value">

<value>

<type name="XSL"/>

</value>

</property>
        <property name="data">

<data>

<output ref="part:*"/>

</data>

</property>
    </feature>
    <feature ref="ProcessFeature" mustUse="true">
        <property name="process">

<process name="IS_OUT" side="receiver"/>

<msg="name:foo1MsgOut"/>

</property>
        <property name="value">

<value>

<type name="JavaScript_DOM">

<library usable="Only the process">

<platform usable="platform">

<library unusable="process">

</type>

</value>

</property>
        <property name="data">

<data>

<output ref="part:*"/>

</data>

</property>
    </feature>
</portType>
<binding name="fooSoap" type="fooPt">
    <soap:binding transport="http://example.com/http"/>
    <operation name="foo1OP">
        <input/>
```

```
        <output/>
    <feature ref="ProcessFeature" mustUse="false">
        <property name="process">

<process name="XSL_OUT" side="sender"/>

<msg="name:foo1MsgOut"/>

</property>
        <property name="value">

<value>

<type name="XSL">

<value>

</property>
        <property name="output">

<data>

<input ref="part:*"/>

<data>

</property>
    </feature>
</operation>
<feature ref="ProcessFeature" mustUse="false">
    <property name="process">

<process name="PERL_IN" side="receiver"/>

<msg="type:inbound"/>

</property>
    <property name="value">

<value>

<type name="PERL">

<library usable="DOM"/>

<library unusable="HTTP"/>

</type>

</value>

<data>

</property>
    </feature>
</binding>
```

Thus in the previous example four uses of the functionality are illustrated:
1) The first processing XSL IN prompts a client to include in this request an XSL script (type name="XSL"/)

which will be executed at the level of the service (side="receiver")

and will produce the data as requested by the service. This processing is optional (mustUse="false"), and applies to one or more parts (output ref="part"/)

of the message 'foo1MsgIn'

(msg="name:foo1MsgIn");

Thus it is possible for an intermediate node in a communication network to add an XSL script to a message and to send it to a final receiver, who will execute the script and then process the request.

The workload of an intermediate node which does not need to implement the script language, here the XSL script, is thus reduced.

2) The second processing JS_OUT obliges a client to support the JavaScript scripts in the return messages;
3) The third processing XSLT_OUT prompts the client to supply an XSLT script which will be applied to the return message; and
4) The fourth processing PERL_IN prompts the client to add PERL scripts in all the messages received by the service (msg="type:inbound").

The processing can use the DOM functionalities (<library usable = "DOM"/>)

of PERL but must not use the HTTP functionalities (<library unusable = "HTTP"/>).

It is thus possible to describe processings applied to various messages exchanged during the implementation of a Web service on a communication network.

Figure 2:
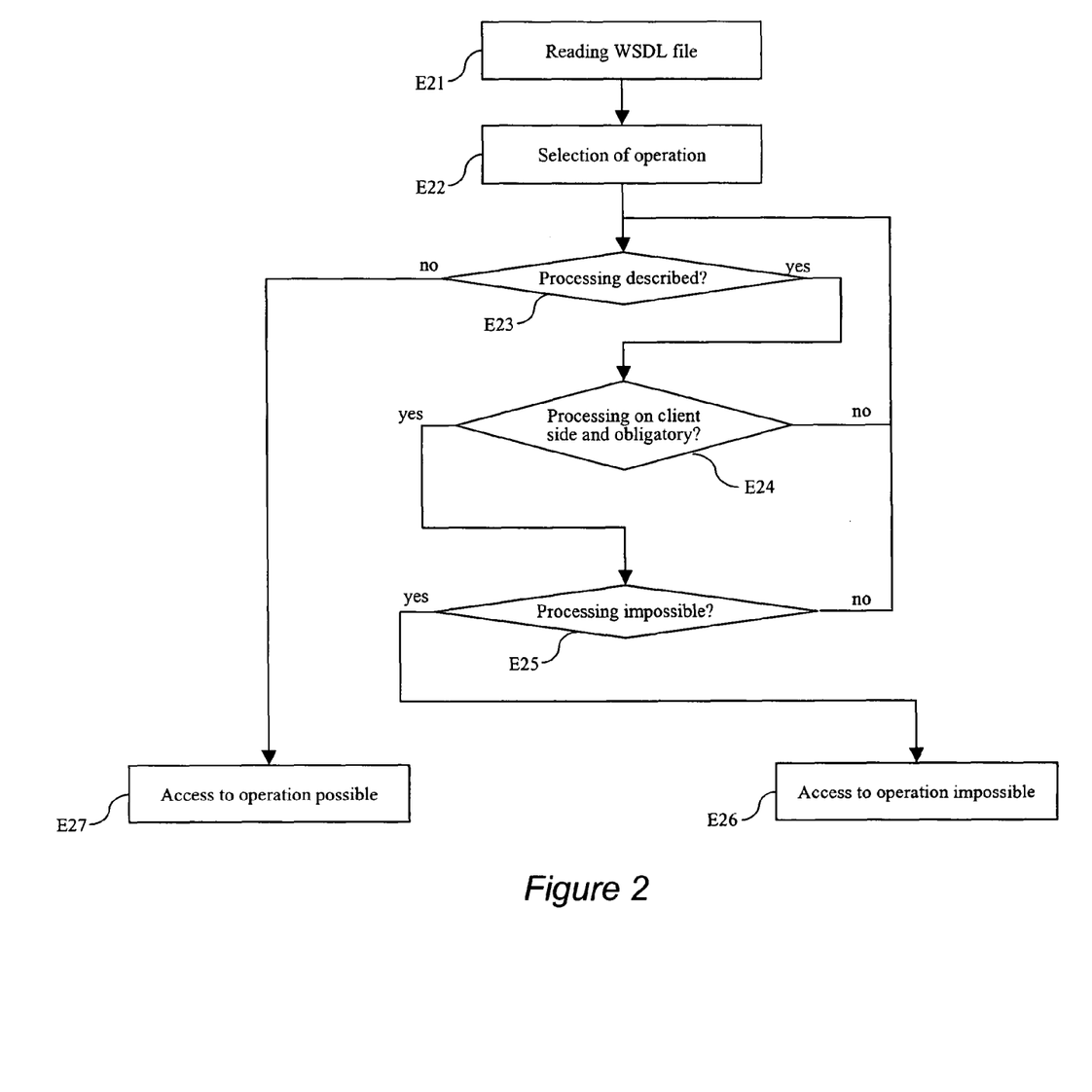
FIG. 2 is an algorithm illustrating a method of testing access to a service in accordance with one embodiment of the invention.

A description will now be given with reference to FIG. 2 of a method of testing access to a service using a service description document as described previously.

This access test method enables a client computer to check whether it is capable of interacting with a service offered by a server computer in the communication network, on receipt of a service description document of the WSDL type as described above.

To verify this access, the client computer is adapted to test various things and in particular the protocols which can be used for executing the service.

In particular, and the following description will be limited to dealing with this point, the client computer is adapted to check whether it is adapted to implement the functionality describing a preprocessing or post-processing of the data and whether it is in a position to carry out each processing requested.

In particular, the client computer will check the type of script proposed for implementing the processing, via the description of the property "value" described previously.

A first reading step E21 is implemented for reading the WSDL document adapted to describe the service.

A selection step E22 is adapted to select an operation described in the WSDL document, that is to say a series of messages exchanged when a service is executed on the communication network.

For this operation, a test step E23 is adapted to check whether there exists a processing described associated with this operation.

In practice, a step of extracting the description of the functionality is implemented.

If no processing is described, a response is sent in a response step E27 in order to indicate that access to the operation is possible for the client computer.

If not, a test step E24 checks whether the processing is obligatory and must be executed by the client computer in the communication network.

In practice, a reading step reads a value associated with the property "process" adapted to specify the node in the communication network which is to execute the processing.

A step of reading the value of the property "rule", making it possible to specify whether the processing is obligatory or optional, is also implemented during this test step E24.

When this processing is obligatory and must thus be executed by the client computer in the communication network, a verification step E25 verifies whether the processing is supported by the client computer in the communication network.

In particular, the client computer must verify whether the type of script proposed via the description of the property "value" is indeed implemented by the client computer.

In the affirmative, if this processing is supported by the client computer, the test steps E23 to E25 are reiterated for the other processings associated with the operation.

If at the end of the verification step E25 the obligatory processing which can be executed by the computer is not supported by the latter, a message declaring access to the operation impossible is sent in a response step E26 to the client computer.

On the other hand, if all the processings are supported by the client computer, at the end of the test step E23, when all the processings have been analyzed, a response is sent to the client computer in a response step E27 indicating that access to the operation is possible.

Figure 3:
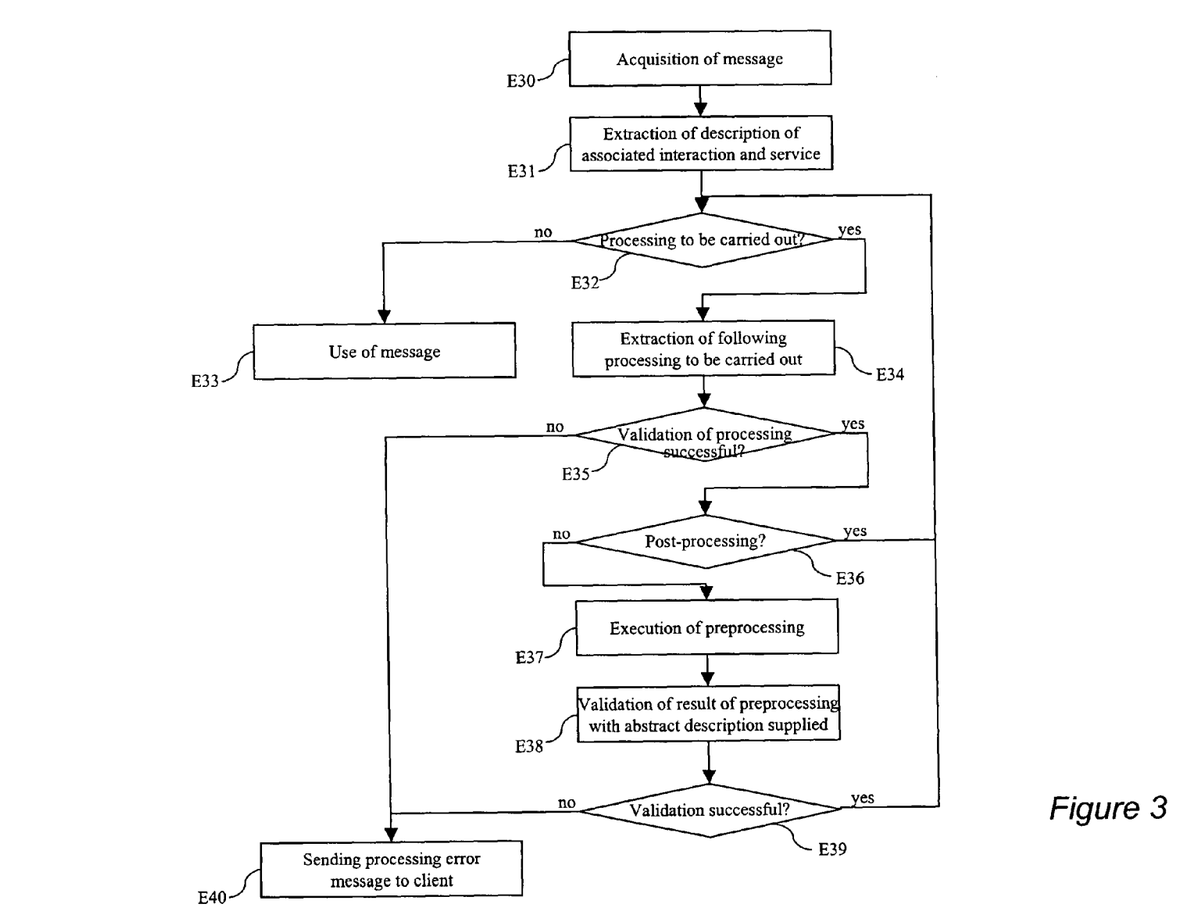
FIG. 3 is an algorithm illustrating a method of validating a message received by a computer in accordance with one embodiment of the invention.

A description will now be given with reference to FIG. 3 of a method of validating a message received by a computer in the communication network.

This message validation method enables an intermediate node in the network, situated between a sender and receiver of a message, to validate the message comprising the processings. This validation of the message is carried out by means of the knowledge of a document describing a WSDL service as described previously.

This intermediate node in the communication network can possibly perform processings. If it does not perform the processing, it is adapted to verify that the receiving computer is capable of performing the processings on the message sent. If neither the receiver nor the intermediate node are capable of performing the processing, the intermediate computer can possibly direct the message to another node in the communication network adapted to implement the processing.

If this intermediate computer performs processings, it will verify whether the data produced at the end of this processing are indeed validated vis-á-vis the data type allocated to the data as described in the WSDL description document according to the invention.

In practice, a message acquisition step E30 is implemented at the intermediate node.

The description of the associated service is next identified in an extraction step E31 by means of the reading of a WSDL service description document according to the invention.

It is checked in a test step E32 whether there are any processings to be carried out. If not, a utilization step E33 is adapted to utilize the message provided that there is no processing to be carried out. Otherwise an extraction step E34 extracts a processing in the message received.

A validation step E35 is then implemented in order to validate the processing with respect to the description made in the document describing a WSDL service.

In practice at least one imperative value is acquired associated with a processing property as defined in the message and in a verification step it is checked whether this imperative value is indeed included in a list of values attributable to the property supported by the functionality as described in the document describing a WSDL service.

If at the end of this validation step E35 the processing is not validated, a sending step E40 is adapted to send an error message to the client computer.

Otherwise, if the processing is validated at the end of the validation step E35, a test step E36 is implemented in order to verify whether or not it is a case of a preprocessing.

In practice, during this test step E36, the value associated with a property adapted to specify whether the processing is executed before or after the sending of the message is read.

If this value is adapted to specify that the processing must be executed before the sending of the message, an execution step E37 is then implemented in order to execute this preprocessing.

Otherwise, if at the end of the test step E36 the value of the property is adapted to specify that the processing must be executed after the sending of the message, it is deduced from this that it is a case of a post-processing and step E32 et seq are reiterated for a new processing, if such exists in the message.

After the step E37 of executing a preprocessing, a validation step E38 is implemented in order to validate the result obtained by the preprocessing with respect to the type of data specified in the WSDL description document.

A test is carried out in a test step E39 to determine whether this validation is successful or not. In the negative, the step E40 of sending an error message is implemented.

Otherwise all of steps E32 et seq are reiterated for another processing incorporated in the message.

Figure 4:
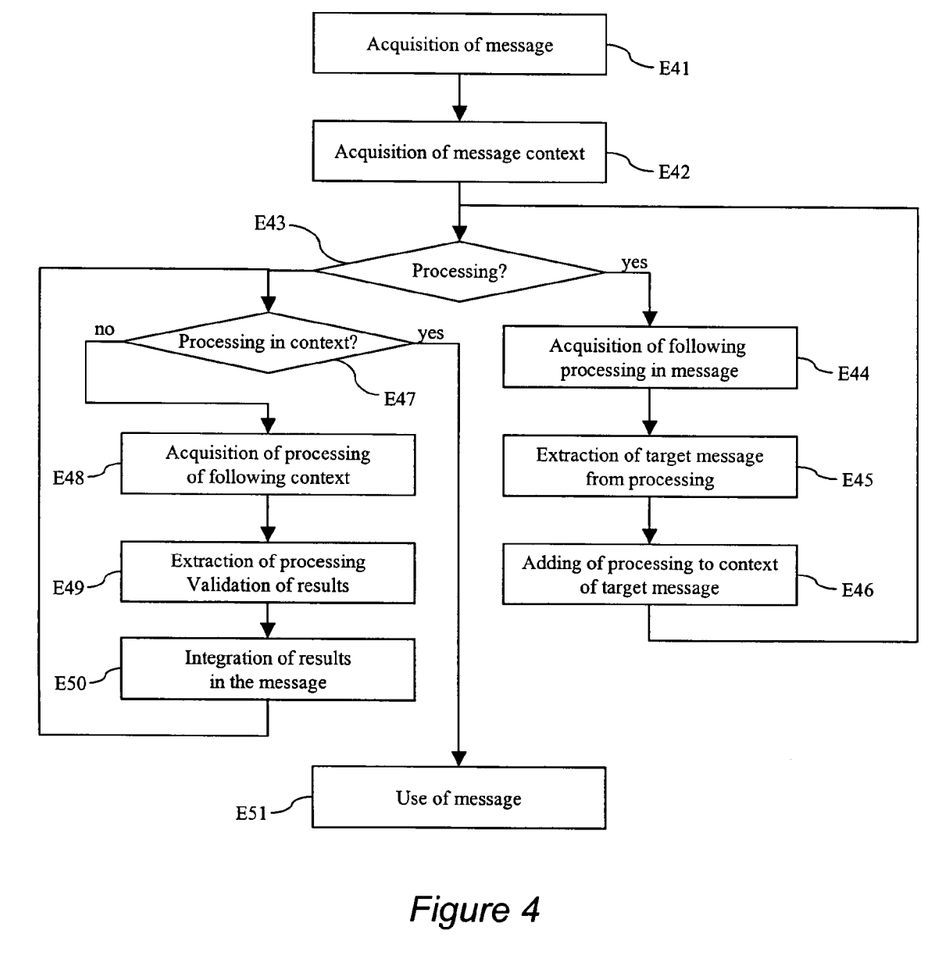
FIG. 4 is an algorithm illustrating the execution of a message including a processing.

A method of processing a message comprising processings will now be described with reference to FIG. 4.

Each message has a context which is associated with it. This context has processing information not included in the message. For example, this information may come from previous messages containing processing information concerning the message.

Once the message and its context have been acquired, the processings are enumerated. Each processing is allocated to the context (created if necessary) of the target message, this target message being able to be different from the message containing the processing information.

This context thus represents an ordered list of processings.

When the processings included in the message have been enumerated, all the processings included in the context are carried out, in the order specified by the context. After having executed this processing, the results are validated according to the type of result expected. In the case of a positive validation, these results are added to the message. When there is no longer any processing to be carried out, the message can be used, that is to say sent or processed as a function invocation at a distance.

In practice, a first acquisition step E41 is implemented in order to receive the message. A step E42 of acquiring the context of the message is also performed. In this way the description of the exchange associated with the message is obtained. It is then checked in a test step E43 whether there are processings to be performed on the message.

In the affirmative, all these processings are extracted and analyzed. Thus an acquisition step E44 is implemented in order to obtain the following processing incorporated in the message. In an extraction step E45, the target message is extracted from the processing and in an addition step E46 the processing is added to the context of the target message.

Thus these various steps E44 to E46 make it possible to store in the context of the target message all the processings to be added to this message.

When at the end of the test step E43 there is no longer any processing to be carried out on the message, it is checked in a test step E47 whether there are processings to carry out, as incorporated in the context.

If it is a case of an immediate processing of the data of the message, the processing is acquired in an acquisition step E48 and is executed.

An extraction step E49 extracts the results of the processing and validates these results according to the model data expected at the end of the processing.

When these results are validated, an integration step E50 integrates the result of the processing of the message.

The processing steps E48 to E50 are reiterated as long as there are processings to be carried out in the context.

At the end of step E47, when there is no longer any processing to be carried out at the node in question, any other processings which are to be carried out after sending of the message by another computer in the network these processings are encoded as information on the functionality and are added to the message.

When there is no longer any processing, the message is used in the utilization step E51, that is to say the message is sent to the following node in the communication network.

Two examples of encoding of the information on a functionality which are introduced into a message are described below. Thus encoding is carried out on a processing to be carried out in a message, during an interaction between a client and a server. The values of the properties are fixed and the functionality encodes this information in the message.

This information is put in the header of the message.

```
<Soap Envelope
xmlns:Soap="http://schemas.xmlsoap.org/soap/envelope/">
  <Soap Header>

<sf:feature name="XSLT_IN" id="1" msg="self"

side="receiver"> xmlns:sf="http://examples.com/soap/ProcessFeature"
          Soap:role="http://www.w3.org/2002/06/soap-
envelope/role/next"
          Soap:mustUnderstand="true">

<sf:data>

<input ref="part:part1"/>

<output ref="part:part1"/>

</sf:data>

<sf:processing type="XSLT">

<xsl:stylesheet version="1.0"
xmlns:xsl="http://www.w3.org/.../Transform">
          <xsl:template match="/">
          ...
          </xsl:template>
        </xsl:stylesheet>

</sf:processing>

</sf:feature>
  </Soap:Header>
  <Soap Body>
    <part1 sf:name="xsltin" sf:id="1"/>
    <part2>
    ...
    </part2>
  </Soap:Body>
</Soap:Envelope>
```

In this previous example, the message comprises a script to be executed on this message on reception. This script is of the XSL type and will use data contained in the part "Part1" of the message and replace them with the result of the script.

The scheme of the data input is not given, but it could be added via an attribute "type" of the element "input". The scheme of the output data is not given explicitly but it must correspond to the scheme described in the document describing a WSDL service of the service receiving the message.

```
<Soap:Envelope
xmlns:Soap="http://schemas.xmlsoap.org/soap/envelope/">
  <Soap:Header>
    <sf:feature
xmlns:sf="http://examples.com/soap/ProcessFeature"

name="XSLT_OUT" id="1" msg="foo1MsgOut"

side="sender"

Soap:role="http://www.w3.org/2002/06/soap-
envelope/role/next"
          Soap:mustUnderstand="true">
```

-continued

```
      <sf:data>

<input ref="part:part1"/>

<output ref="part:part1"/>

</sf:data>

<sf:processing type="XSLT">

<xsl:stylesheet version="1.0"
xmlns:xsl="http://www.w3.org/.../Transform">
          <xsl:template match="/">
          ...
          </xsl:template>
        </xsl:stylesheet>

</sf:processing>

</sf:feature>
  </Soap:Header>
  <Soap:Body>
    <part1 sf:name="xsltin" sf:id="1"/>
    <part2>
    ...
    </part2>
  </Soap:Body>
</Soap:Envelope>
```

In this second example, the message comprises a script to be executed on a message "foo1MsgOut" before sending the message. The script is also of the XSL type and uses the data contained in the part "Part1" of the message. The processing is adapted to replace these data with the result of the script.

In this example, the node which receives the message will store the information and use it correctly: if it sends the message "foo1MsgOut", it will apply the script to this message before sending it. Otherwise it will send the processing information to the node, which will send the message "foo1MsgOut".

The present invention thus makes it possible to define a means of describing a service which makes it possible to describe the preprocessings and post-processings which the service can form.

In order to implement the method of offering a service as described previously with reference to FIG. 1, a device for offering a service essentially comprises means of sending a document describing a service comprising a description of a functionality implemented during a preprocessing or post-processing of data in XML format of a message exchanged during the execution of the service on the communication network.

Likewise a device for testing access by a client computer in a communication network comprises essentially means of extracting a description of a functionality implemented during a preprocessing or the post-processing of data in XML format of a message exchanged during the execution of a service on the communication network, means of reading the value associated with a property adapted to specify the node in the communication network adapted to execute the processing and the value of a property adapted to specify whether the processing is obligatory or optional, and means of checking whether the processing is supported by the client computer in the communication network when the processing is obligatory and must be executed by the client computer in the communication network.

Finally, a device for validating a message by an intermediate computer in a communication network comprises means of extracting a processing in the message received, means of acquiring at least one imperative value associated with a property of the processing and verification means adapted to verify whether the imperative value is included in a list of values which can be attributed to a property supported by the functionality described in the service description document.

Figure 5:
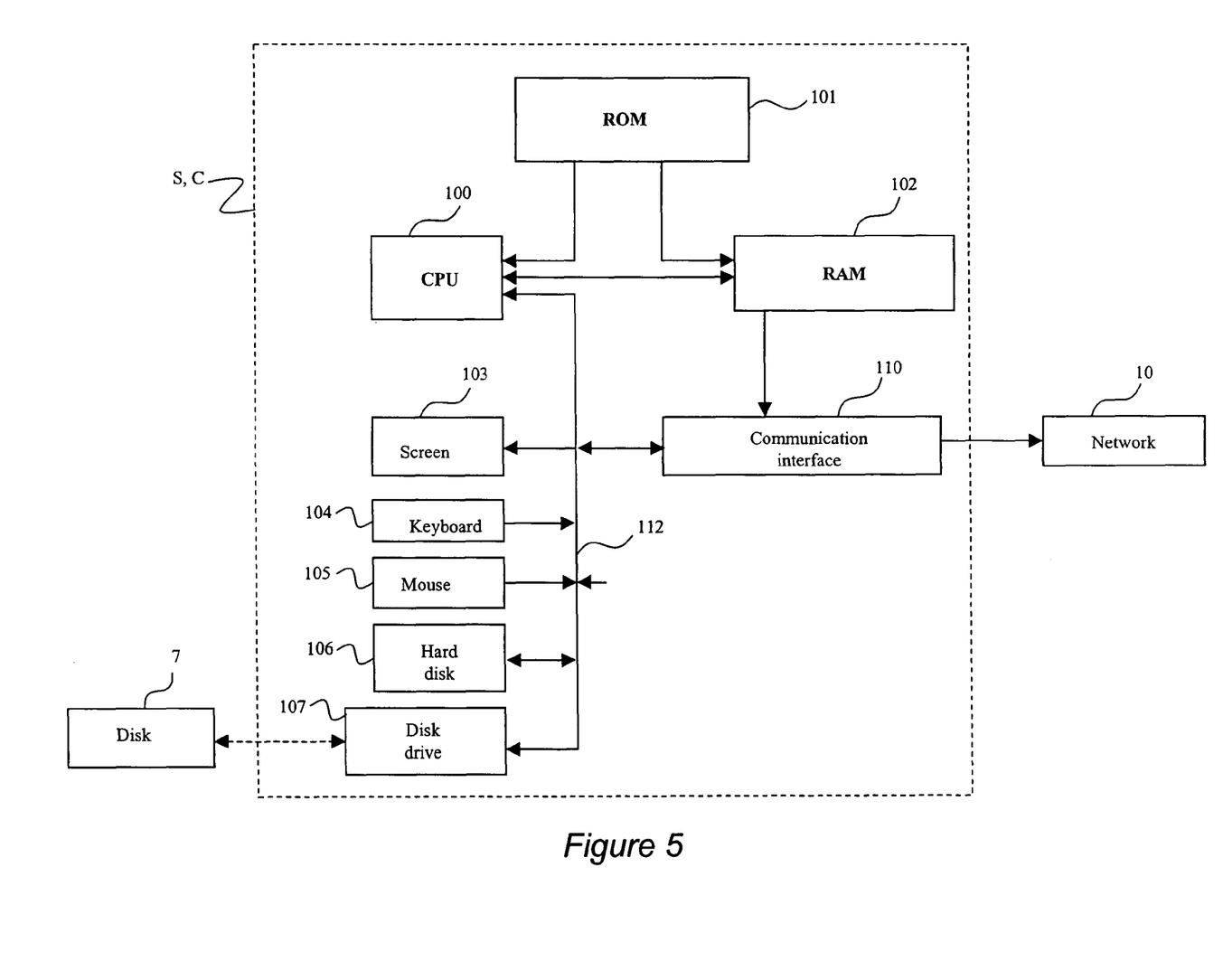
FIG. 5 is a block diagram illustrating a device adapted to implement the invention.

These devices for offering a service, for testing access to a service and for validating a message can be incorporated in a computer as illustrated in FIG. 5.

In particular, the device offering a service is incorporated in a server computer S in a communication network whilst the device for testing access to a service is incorporated in a client computer C in a communication network.

More precisely, the various means identified above can be incorporated in a microprocessor 100, a read only memory 101 (or ROM) being adapted to store a program for offering a service and/or testing access to a service and/or validating a message.

Naturally, these devices for offering a service, for testing access or validating a message can be used in one and the same computer or in different stations in the communication network.

A random access memory 102 (or RAM) is adapted to store in registers the values modified during the execution of the program offering a service, or testing access to a service or validating a message.

The microprocessor 100 is integrated in a computer which can be connected to various peripherals and to other computers in a communication network 10. In particular, this computer corresponds to a server computer S or a client computer C in this communication network 10.

This computer S, C comprises in a known fashion a communication interface 110 connected to the communication network in order to receive or transmit messages.

The computer also comprises document storage means such as a hard disk 106, or is adapted to cooperate by means of a disk drive 107 (diskettes, compact disks or computer cards) with removable document storage means such as disks 7. These fixed or removable storage means can comprise the code of the methods according to the invention.

They are also adapted to store an electronic service description document as defined by the present invention.

By way of variant, the program enabling the device offering a service, testing access or validating a message can be stored in the read only memory 101.

In a second variant, the program can be received in order to be stored as described previously by means of the communication network 10.

The computer S, C also has a screen 103 making it possible for example to serve as an interface with the operator by means of the keyboard 104 or the mouse 105 or any other means.

The central unit 100 (CPU) will then execute the instructions relating to the implementation of the invention. On powering up, the programs and methods relating to the invention stored in a non-volatile memory, for example the memory 101, are transferred into the memory 102, which will then contain the executable code of the invention as well as the variables necessary for implementing the invention.

The communication bus 112 affords communication between the various sub-elements of the computer or connected thereto.

The representation of this bus 112 is not limiting and in particular the microprocessor 100 is able to communicate instructions to any sub-element directly or by means of another sub-element.

Naturally many modifications can be made to the example embodiments described above without departing from the scope of the invention.

The invention claimed is:

1. A method of offering a service provided by a server computer in a communication network, comprising:
   sending, from the server computer that provides the service to a client computer, a service description document in a language for describing web services, which is independent of any client or user characteristic, the service description document comprising a description defining the type, content and sequencing of data exchanged between said server and any client when said service is executed, and comprising a description of a processing functionality implemented during a preprocessing or post-processing of data in XML format of a message exchanged during the execution of said service on the communication network,
   wherein the description of said processing functionality comprises a list of properties supported by said processing functionality, said properties defining at least respectively, the node in the communication network adapted to execute said processing, and the type of processing,
   wherein the description of said processing functionality comprises a property adapted to specify whether the processing to be carried out is obligatory or optional, and
   wherein said processing functionality also comprises a property adapted to specify whether said pre-processing is carried out on the reception of said message before executing said service or whether said post-processing is carried out on the sending of said message after executing said service.

2. The method according to claim 1, wherein said processing functionality defines preprocessing or post-processing adapted to produce or use data in XML format defined in a first abstract part of the service description document.

3. The method according to claim 2, wherein the description of said processing functionality is inserted in said first abstract part of the service description document.

4. The method according to claim 1, wherein said preprocessing or said post-processing is implemented via a script language.

5. The method according to claim 1, wherein said processing functionality description is defined as a data item in XML format in a first abstract part of the service description document.

6. The method according to claim 5, wherein said data item in XML format defining said processing functionality description is encoded in a second concrete part of the service description document.

7. The method according to claim 1, wherein said processing functionality also comprises a property adapted to specify the message or a set of messages to which said pre-processing or post-processing applies.

8. The method according to claim 1, wherein said processing functionality also comprises a property adapted to define the data produced or used by said preprocessing or post-processing, and may also include the type of said data.

9. The method according to claim 1, wherein, for at least one property supported by said processing functionality, the description of said processing functionality comprises a list of values attributable to said property.

10. A server computer in a communication network, comprising means adapted to implement the method of offering a service according to claim 1.

11. A computer-readable storage medium on which is stored a computer executable program to implement the method of offering a service according to claim 1.

12. A method of testing access to a service by a client computer in a communication network, from a service description document, comprising the following steps implemented by said client computer:
    extracting from said service description document, provided by a server computer offering said service, a description of a processing functionality implemented during a preprocessing or the post-processing of data in XML format of a message exchanged during the execution of the service on the communication network;
    reading, from the extracted description of said processing functionality, a value associated with a property adapted to specify whether the processing must be executed by the client computer;
    reading, from the extracted description of said processing functionality, a value of a property adapted to specify whether the processing is obligatory or optional; and
    verifying whether the processing is supported by the client computer in the communication network when said processing is obligatory and must be executed by said client computer in the communication network,
    wherein said processing functionality also comprises a property adapted to specify whether said pre-processing is carried out on the reception of said message before executing said service or whether said post-processing is carried out on the sending of said message after executing said service.

13. A client computer in a communication network, comprising means adapted to implement the method of testing access according to claim 12.

14. A computer-readable storage medium on which is stored a computer executable program to implement the method of testing access according to claim 12.

15. A method of validating a message received by an intermediate computer in a communication network, comprising the following steps:
    acquiring the message, at the intermediate computer, from a service description document comprising a description of a processing functionality implemented during a pre-processing or the post-processing of data in XML format of the message exchanged during the execution of a service on the communication network;
    extracting, from the service description document, the description of a service associated with the document;
    extracting a processing from the received message;
    acquiring from said service description document at least one imperative value associated with a property of the processing;
    verifying whether said imperative value is included in a list of values which can be attributed to a property supported by said processing functionality described in the service description document;
    reading a value associated with a property adapted to specify whether the processing is executed before or after the sending of said message;
    executing said processing when said read value specifies that the processing must be executed before the sending of the message; and
    validating the result of said processing with respect to a type of data specified in said service description document.

16. A computer in a communication network, comprising means adapted to implement the method of validating a message according to claim 15.

17. A computer-readable storage medium on which is stored a computer executable program to implement the method of validating a message according to claim 15.

18. A device for offering a service provided by a server computer in a communication network, comprising:
    sending means for sending, from the server computer that provides the service to a client computer, a service description document in a language for describing web services, which is independent of any client or user characteristic, the service description document comprising a description defining the type, content and sequencing of data exchanged between said server and any client when said service is executed, and comprising a description of a processing functionality implemented during a preprocessing or post-processing of data in XML format of a message exchanged during the execution of the service on the communication network,
    wherein the description of said processing functionality comprises a list of properties supported by said processing functionality, said properties defining at least respectively, the node in the communication network adapted to execute said processing, and the type of processing,
    wherein the description of said processing functionality comprises a property adapted to specify whether the processing to be carried out is obligatory or optional, and
    wherein said processing functionality also comprises a property adapted to specify whether said pre-processing is carried out on the reception of said message before executing said service or whether said post-processing is carried out on the sending of said message after executing said service.

19. A device for testing access to a service by a client computer in a communication network, from a service description document, implemented by said client computer, comprising:
    extracting means for extracting from said service description document, provided by a server computer offering a service, a description of a processing functionality implemented during a preprocessing or a post-processing of data in XML format of a message exchanged during the execution of the service on the communication network;
    first reading means for reading, from the extracted description of said processing functionality, a value associated with a property adapted to specify whether the processing must be executed by the client computer;
    second reading means for reading, from the extracted description of said processing functionality, a value of a property adapted to specify whether the processing is obligatory or optional; and
    verifying means for verifying whether the processing is supported by the client computer in the communication network when this processing is obligatory and must be executed by the client computer in the communication network,
    wherein said processing functionality also comprises a property adapted to specify whether said pre-processing is carried out on the reception of said message before executing said service or whether said post-processing is carried out on the sending of said message after executing said service.

20. A device for validating a message received by an intermediate computer in a communication network, comprising:

acquiring means for acquiring the message, by the intermediate computer, from a service description document comprising a description of a processing functionality implemented during a preprocessing or a post-processing of data in XML format of the message exchanged during the execution of a service on the communication network;

extracting means for extracting, from the service description document, a description of a service associated with the document;

extracting means for extracting a processing from the received message;

acquiring means for acquiring, from said service description document, at least one imperative value associated with a property of the processing;

verification means for verifying whether the imperative value is included in a list of values which can be attributed to a property supported by the functionality described in the service description document;

reading means for reading a value associated with a property adapted to specify whether the processing is executed before or after the sending of said message;

execution means for executing said processing when said read value specifies that the processing must be executed before the sending of the message; and validating means for validating the result of said processing with respect to a type of data specified in said service description document.

* * * * *